(12) United States Patent
Smeeton

(10) Patent No.: US 9,644,694 B2
(45) Date of Patent: May 9, 2017

(54) VEHICLE LOCKING AND/OR PARKING BRAKE

(71) Applicant: Mark Andrew Smeeton, Toowong (AU)

(72) Inventor: Mark Andrew Smeeton, Toowong (AU)

( * ) Notice: Subject to any disclaimer, the term of this patent is extended or adjusted under 35 U.S.C. 154(b) by 150 days.

(21) Appl. No.: 14/397,145

(22) PCT Filed: May 8, 2013

(86) PCT No.: PCT/AU2013/000470
§ 371 (c)(1),
(2) Date: Oct. 24, 2014

(87) PCT Pub. No.: WO2013/166548
PCT Pub. Date: Nov. 14, 2013

(65) Prior Publication Data
US 2015/0136535 A1 May 21, 2015

(30) Foreign Application Priority Data
May 9, 2012 (AU) .............................. 2012100560

(51) Int. Cl.
*F16D 63/00* (2006.01)
*B60R 25/09* (2013.01)
*F16D 65/16* (2006.01)
*B60T 1/00* (2006.01)
*B60T 1/06* (2006.01)
(Continued)

(52) U.S. Cl.
CPC ............ *F16D 63/006* (2013.01); *B60R 25/09* (2013.01); *B60T 1/005* (2013.01); *B60T 1/062* (2013.01);
(Continued)

(58) Field of Classification Search
CPC .... F16D 63/006; F16D 65/16; F16D 2121/24; F16D 2125/24; B60R 25/09; B60T 1/062; B60T 1/005
See application file for complete search history.

(56) References Cited

U.S. PATENT DOCUMENTS 4,034,824 A * 7/1977 Lucas ..................... B60R 25/09
                                                              180/287
4,622,833 A    11/1986 Shepherd
(Continued)

FOREIGN PATENT DOCUMENTS

EP    0220734 A2    5/1987
GB    2276597 A    10/1994
(Continued)

OTHER PUBLICATIONS

Extended European Search Report for Application No. 13 787 137.2-1503, dated Dec. 4, 2015, 7 pages.
(Continued)

*Primary Examiner* — Xuan Lan Nguyen
(74) *Attorney, Agent, or Firm* — Chiesa Shahinian & Giantomasi PC

(57) ABSTRACT

A wheel locking or parking brake assembly for a vehicle. In one embodiment, the wheel locking or parking brake assembly includes a plate member affixed to a wheel or axle having a plurality of closely spaced holes in a circular configuration or a circumferential flange with a peripheral extension or lug; an electrically powered pin advancing and retracting device; the pin adapted to engage and pass into any of the holes or advance in the path of the extension or lug; electric power supply and electric current polarity reversing device, wherein in operation, the pin remains in
(Continued)

either an advanced or retracted position depending on the direction of the current when the electric power was switched off.

8 Claims, 6 Drawing Sheets

(51) Int. Cl.
 *F16D 121/24* (2012.01)
 *F16D 125/24* (2012.01)
(52) U.S. Cl.
 CPC .......... *F16D 65/16* (2013.01); *F16D 2121/24* (2013.01); *F16D 2125/24* (2013.01)

(56) References Cited

U.S. PATENT DOCUMENTS

| | | | |
|---|---|---|---|
| 5,133,201 A | 7/1992 | LaMott et al. | |
| 5,432,412 A | 7/1995 | Harris et al. | |
| 5,794,639 A | 8/1998 | Einbinder | |
| 2004/0031650 A1 | 2/2004 | Taba | |
| 2004/0187620 A1* | 9/2004 | Newman | F16D 63/006 74/411.5 |
| 2007/0113604 A1* | 5/2007 | Khoury | B60R 25/02153 70/186 |
| 2011/0061483 A1* | 3/2011 | Asakura | B60R 25/02 74/89.25 |

FOREIGN PATENT DOCUMENTS

| | | |
|---|---|---|
| GB | 2468163 A | 9/2010 |
| NL | 8403751 A | 7/1986 |

OTHER PUBLICATIONS

Australian Patent Examination Report No. 1 for Application No. 2013258870; dated Feb. 4, 2016, 3 pages.

* cited by examiner

VEHICLE LOCKING AND/OR PARKING BRAKE

PRIORITY

This application is a National Stage Application under 35 U.S.C. 371 of, and claims priority to, International Application No. PCT/AU2013/000470, filed May 8, 2013, which claims the benefit of priority to Australian Patent Application Serial No. 2012100560 filed May 9, 2012, the priority benefit of which is also herein claimed, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates generally to vehicular equipment and accessories and more particularly, but not exclusively to a locking and/or parking brake for a vehicle wheel or axle.

Description of Related Technology

Vehicle parking brakes are known. While their general purpose is to stop a vehicle from moving while it is parked, due to prior art design constraints and limitations, modern parking brakes generally operate as an auxiliary (as opposed to an independent) mechanism to the existing braking system. For example, they can be a cable operated system to activate the hydraulic drum brakes or disc brake callipers normally used for general braking of a vehicle. As such, they can be readily deactivated to allow the vehicle to be driven. Where there is repetitive use resulting in normal wear and tear, parking brake mechanisms have to be routinely maintained and adjusted to affect safe and full operational service.

Parking brakes however are unsuitable where total vehicle immobility and security are required. This is of particular importance in towed vehicles such as boat trailers, tradesman's work trailers and caravans which are often stolen by the deactivation of their braking or immobilisation apparatus. The obvious prior art solution to this problem is the wheel clamp. Applying a wheel clamping device to a vehicle wheel is time consuming, especially for tradespeople who have to visit several worksites in a day, and can be difficult for the elderly or disabled to use.

One example and possibly the closest prior art to the present disclosure is that disclosed by GB2276597A (Miles et. al.). This patent discloses a wheel clamping device, particularly to prevent the theft of a trailer. It includes an electrically operable means in the form of an electromagnet mounted on the axle of a vehicle adjacent a wheel to be clamped. The electromagnet, in effect a solenoid, causes a locking pin to be held in a withdrawn position when the solenoid is energized and to engage an aperture in a locking plate attached to the wheel when the solenoid is de-energized.

The major disadvantage with this prior art device is that the locking pin will engage the locking plate as soon as the solenoid is de-energized. This can have disastrous consequences if the power supply fails when the vehicle is moving. In the patent, there is a description of a mechanical failsafe device to prevent this from happening when the vehicle is moving. The necessity and inconvenience of having to operate a separate failsafe device makes this invention too cumbersome and complicated a solution to the problem. In addition, the possibility of failing to remember to operate the "failsafe" device is itself a highly dangerous factor.

It is therefore an object of the present disclosure to ameliorate some or all of the above disadvantages of the prior art by providing a novel and innovative vehicle locking and/or parking brake which avoids or ameliorates the problems of the prior art.

SUMMARY

In a first aspect, a wheel locking or parking brake assembly for a vehicle is disclosed. In one embodiment, the assembly includes a plate member configured to be affixed to a wheel or an axle of the vehicle, the plate member having a plurality of evenly spaced holes in a circular configuration; an electrically powered pin assembly comprising a weatherproof housing having an electric motor disposed therein, the electric motor configured to operate a rack and pinion assembly where a rack is configured to be driven by a pinion gear on the electric motor thereby retracting or advancing a locking pin that is configured to engage at least one of the plurality of evenly spaced holes; where the electric motor is affixed to a first portion of the weatherproof housing and the rack is affixed to a second portion of the weatherproof housing such that when the weatherproof housing is opened, the electric motor and the pinion gear are disengaged from the rack thereby comprising a safety override mechanism where the locking pin can be manually retracted or advanced; and an electric power supply; where electric current flowing in a first direction causes the locking pin to advance and engage a hole to lock the wheel from rotating, and where current flowing in a second and opposite direction causes the locking pin to retract from the hole to allow the wheel to rotate; and where the locking pin remains in either an advanced or retracted position depending on whether the electric power supply is switched off.

In a second embodiment, the assembly includes a plate member configured to be affixed to a wheel or an axle of the vehicle, the plate member having a circumferential flange with a peripheral extension or protrusion; an electrically powered pin assembly comprising a weatherproof housing having an electric motor disposed therein, the electric motor configured to operate a rack and pinion assembly, where a rack is configured to be driven by a pinion gear on the electric motor thereby retracting or advancing a locking pin; where the electric motor is affixed to a first portion of the weatherproof housing and the rack is affixed to a second portion of the weatherproof housing such that when the weatherproof housing is opened, the electric motor and the pinion gear are disengaged from the rack thereby comprising a safety override mechanism where the locking pin can be manually retracted or advanced; and where the locking pin is configured to engage the peripheral extension or protrusion; and an electric power supply; where electric current flowing in a first direction causes the locking pin to advance in the path of the extension or protrusion to lock the wheel from rotating, and where current flowing in a second and opposite direction causes the locking pin to retract from the path of the extension or protrusion to allow the wheel to rotate; and where the locking pin remains in either an advanced or retracted position depending on whether the electric power supply is switched off.

In a variant, the plate member comprises a disc of a disc brake assembly for the vehicle.

In another variant, the plate member comprises an auxiliary disc having a plurality of wheel stud engaging apertures to accommodate various wheel stud configurations, the auxiliary disc configured to be secured to the vehicle wheel via a plurality of wheel studs and a plurality of respective wheel nuts.

In yet another variant, the plurality of evenly spaced holes are circular and the locking pin has a tapered end for facilitating entry into the holes.

In yet another variant, the electric power supply comprises a battery coupled to a polarity reversing switch which is electrically operated by a remote control.

In yet another variant, the electric power supply comprises a vehicles battery and where a polarity reversing switch is operable via the vehicles existing electric system.

In yet another variant, the weatherproof housing further comprises a lock configured to keep the weatherproof housing locked as a security measure.

In yet another variant, the electrically powered pin assembly is affixed to a mounting plate, the mounting plate being affixed in place by one or more U-bolts configured to secure the axle to one or more springs of the vehicle.

In yet another variant, the mounting plate is of a universal design that is configured to fit a differing range of vehicles.

In yet another variant, the electrically powered pin assembly is mounted directly to a disc brake calliper or a disc brake calliper supporting structure.

In yet another variant, the peripheral extension or protrusion comprises a lug located on the circumferential flange.

BRIEF DESCRIPTION OF THE DRAWINGS

In order for the present disclosure to be better understood reference will now be made to the accompanying drawings, wherein.

DETAILED DESCRIPTION

Figure 1:
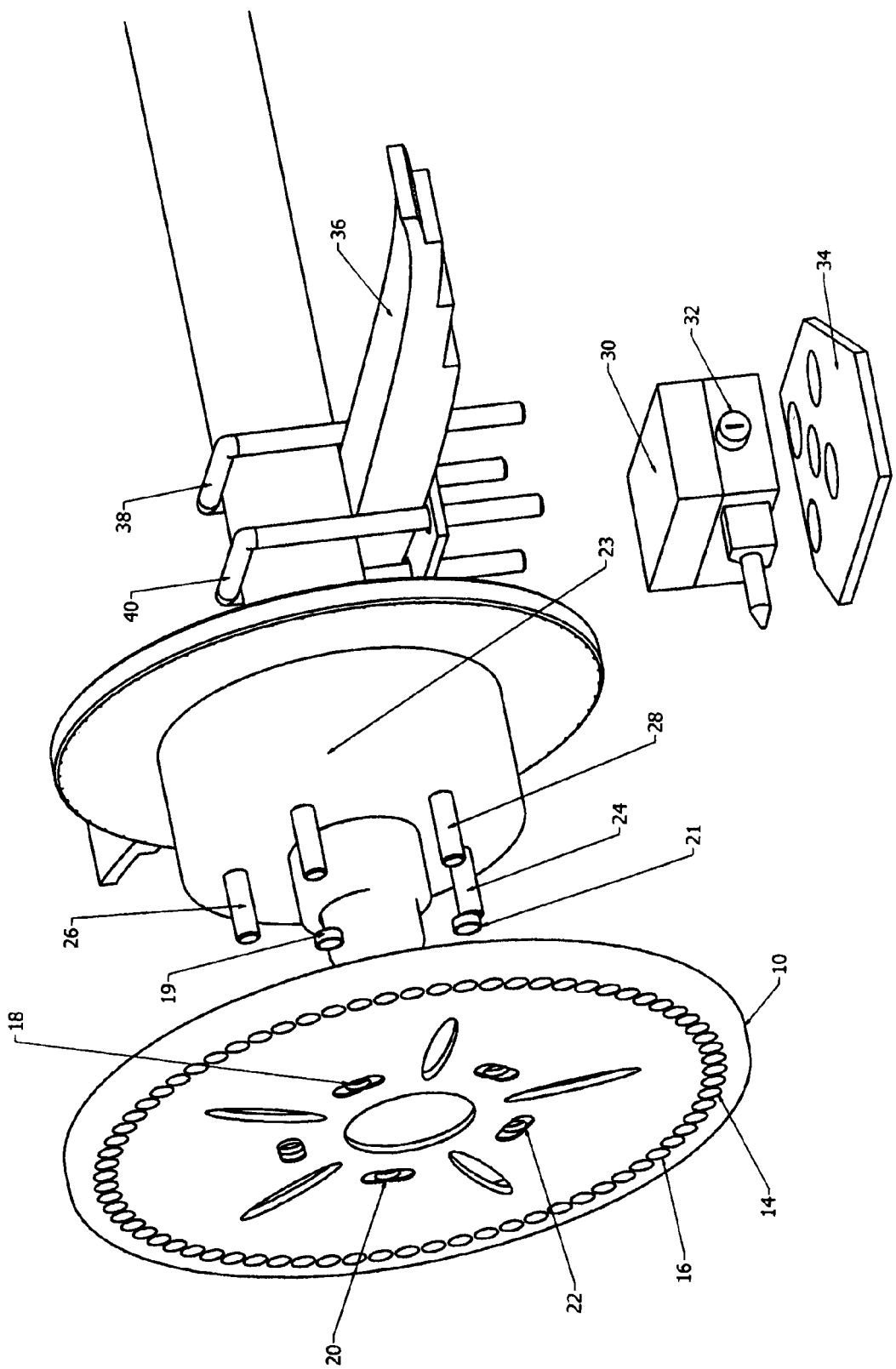
FIG. 1 shows an exploded view of a preferred example of the present disclosure.

Referring now to FIG. 1 there is shown an exploded view of a preferred example of the present disclosure. In this embodiment the circular plate 10 has evenly and closely-spaced holes 12, 14, 16 in a circular configuration located substantially at the periphery or circumferential region of the plate. The plate has slots or apertures 18, 20, 22 by which it can be affixed to the disc hub 23 by means of wheel nuts (not shown) tightened over the wheel studs 24, 26, 28. In this example, there are anti-wear ferrules 19, 21 which are located between the slots and the wheel studs. The pin advancing and retracting mechanism (not shown) is housed in a robust hinged weatherproof container 30 having a keyed security lock 32. The housing is mounted to the mounting plate 34 adapted to be bolted to underside of the springs 36 via axle u-bolts 38, 40.

Figure 2:
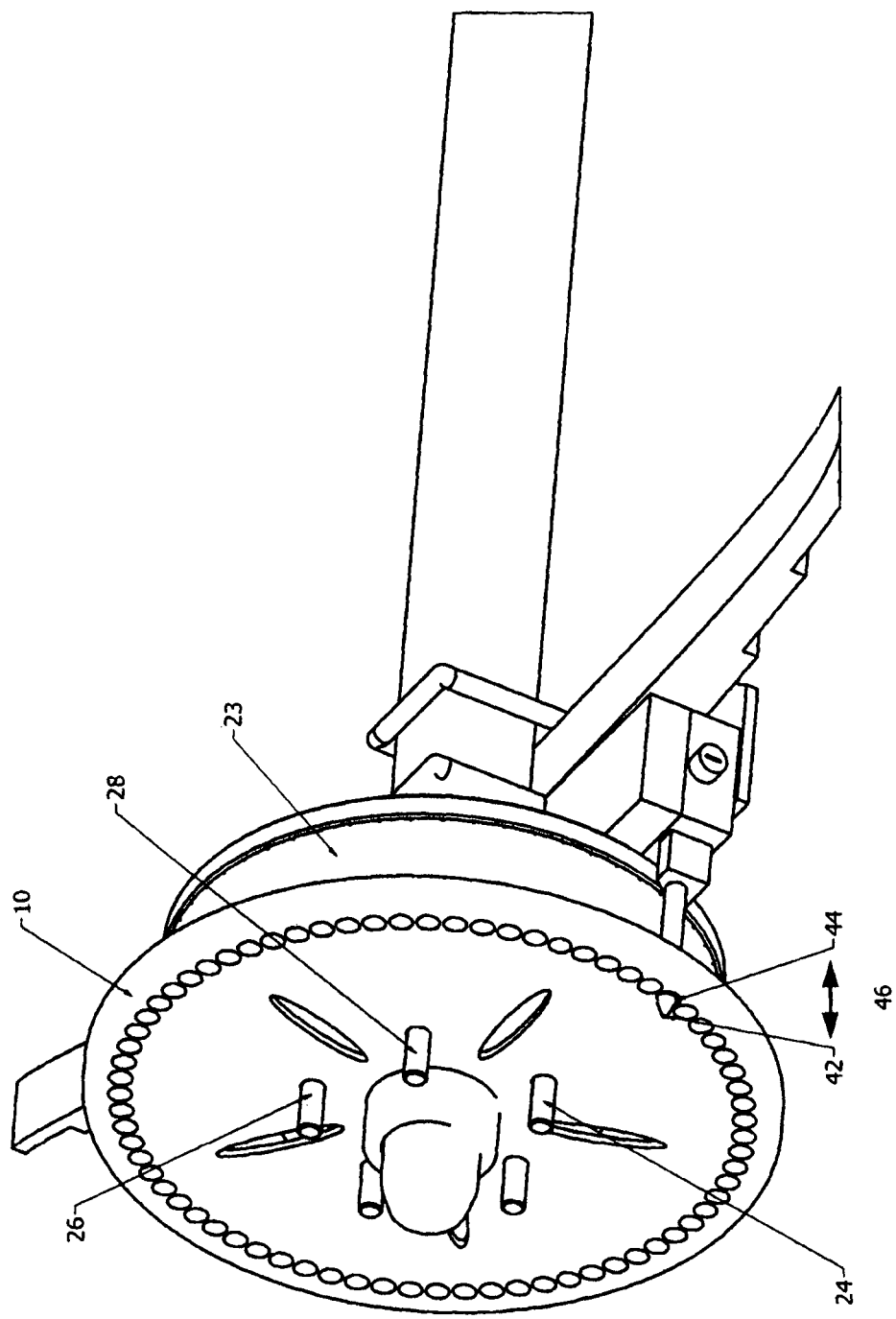
FIG. 2 shows an assembled view of the example of FIG. 1.

FIG. 2 shows the components of FIG. 1 fully assembled. The plate 10 has been located by the wheel studs 24,26,28 to the disc hub 23. The pin 42 is shown in the advanced position engaging and passing through a hole 44 in the peripheral region of the plate preventing the plate 10, disc hub 23 and wheel (not shown) from rotating in either direction of arrow indicator 46.

Figure 3:
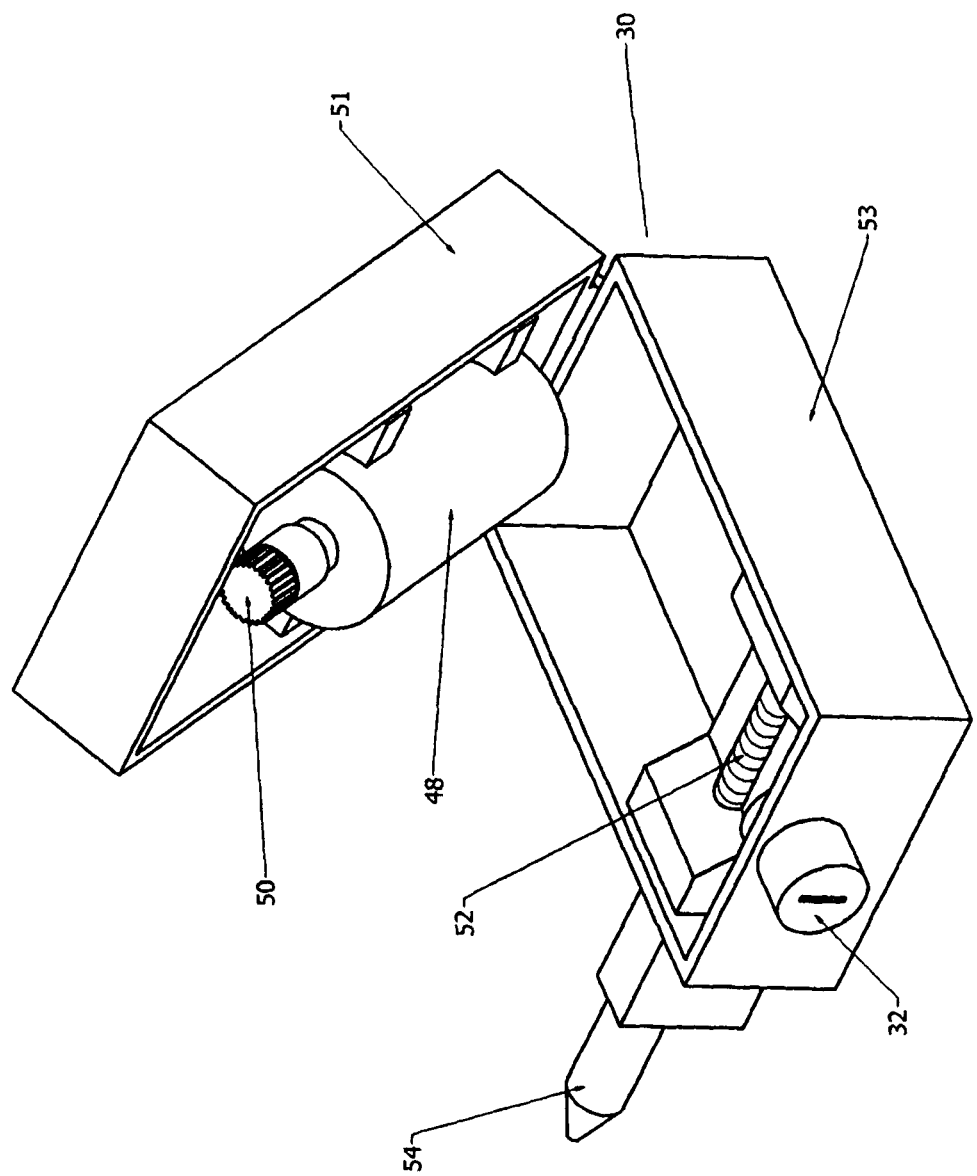
FIG. 3 shows a preferred pin advancing and retracting means according to the principles of the present disclosure.

FIG. 3 shows detail of components of the pin advancing and retracting means comprising a housing in the form of a weatherproof hinged container 30 secured with a keyed lock 32. On opening the housing, the reversing electric motor 48 and pinion gear 50 fixed on hinged portion 51 is separated from rack 52 which advances and retracts pin 54 located in hinged portion 53. This functions as a safety override mechanism wherein the pin can be manually advanced or retracted should the power supply fail.

Figure 4:
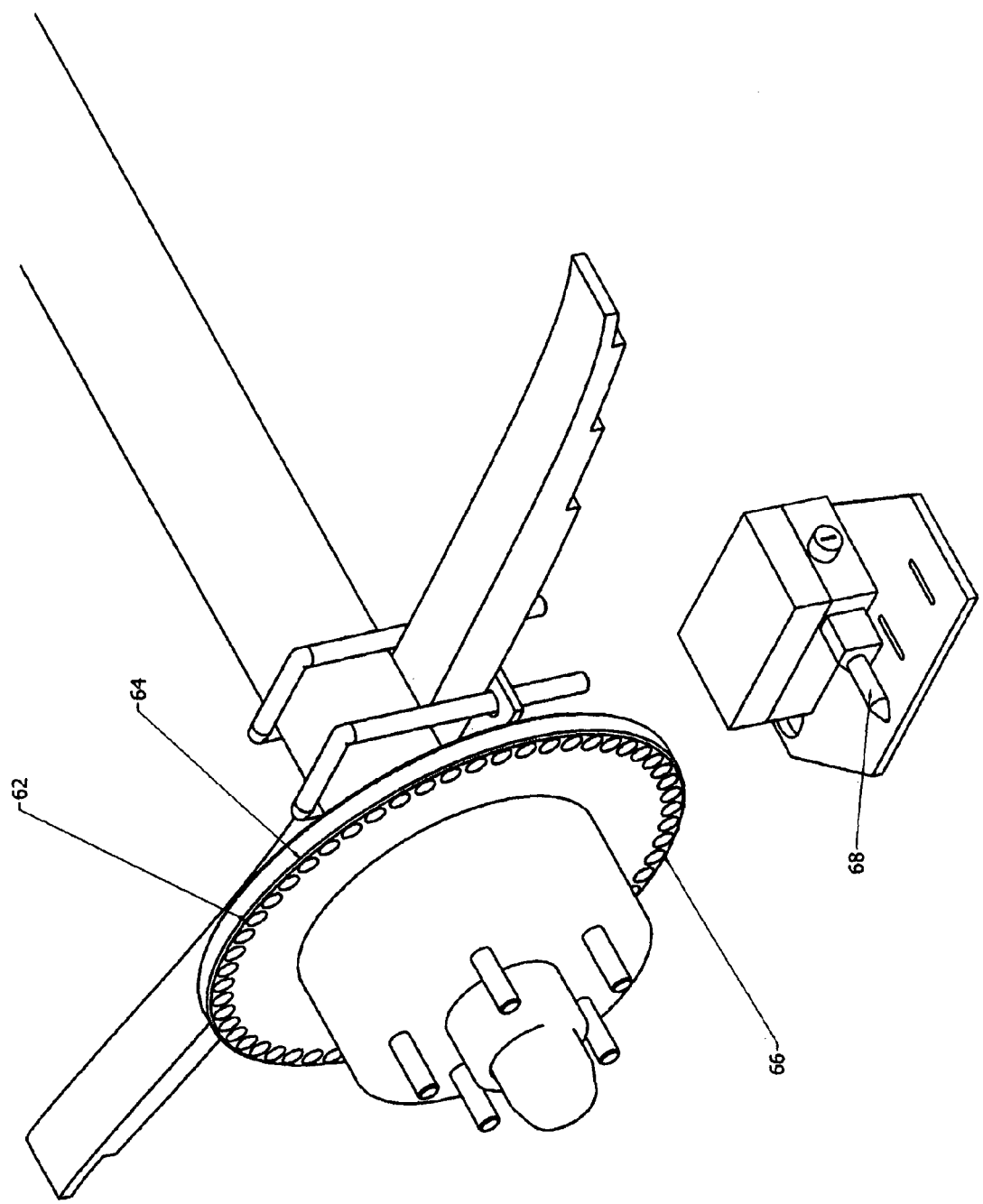
FIG. 4 shows an integrated disc brake version of the present disclosure.

FIG. 4 shows an integrated disc brake version of the present disclosure. The disc 60 of the disc brake assembly has peripherally located holes 62, 64, 66 for engagement by the pin 68. In all other aspects, the embodiments of the present disclosure functions the same way.

Figure 5:
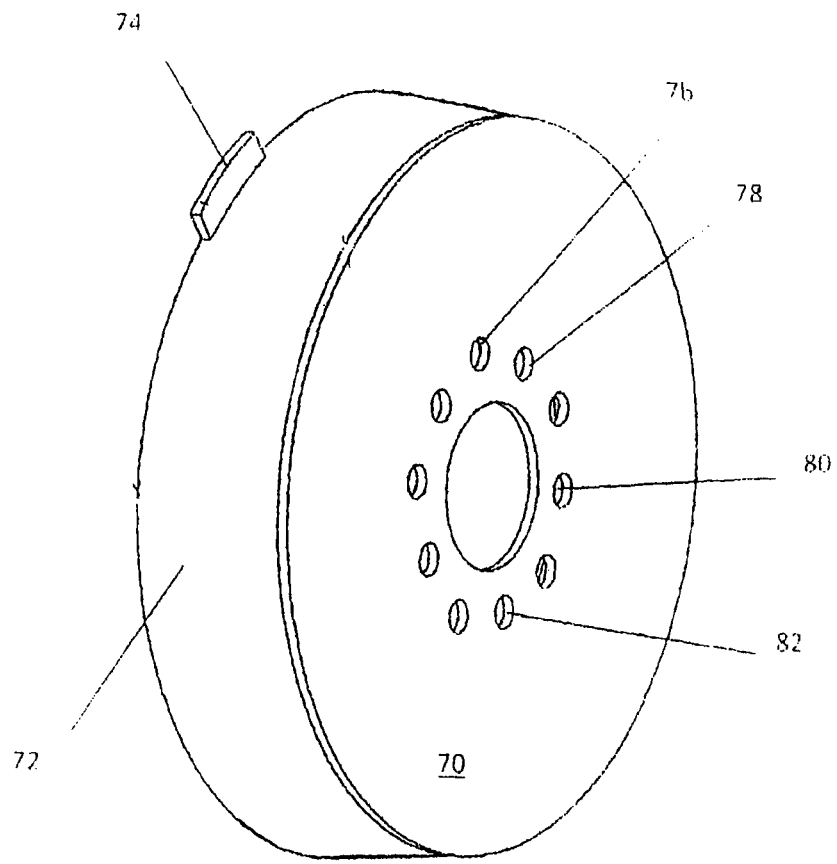
FIG. 5 shows a circumferential flange with a peripheral extension or protrusion of the present disclosure.

FIG. 5 shows a plate 70 having a circumferential flange 72 with a peripheral extension or protrusion as a lug 74 located on the rim of the flange. The plate has apertures 76,78,80,82, by which it can be affixed to be secured to the vehicle by its wheel studs and wheel nuts (not shown).

Figure 6:
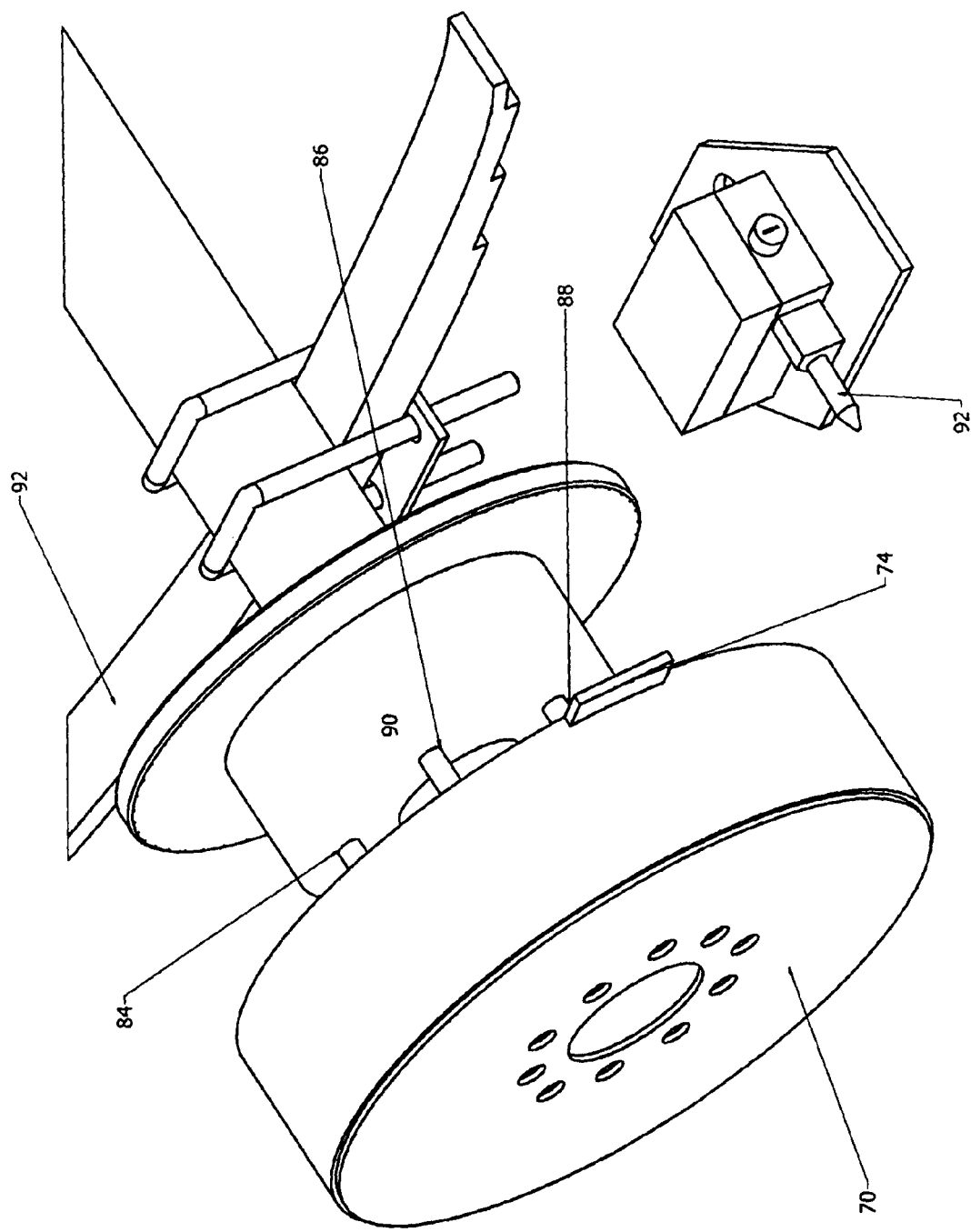
FIG. 6 shows an assembled view of the flange of FIG. 5.

FIG. 6 shows an assembled view of the flange of FIG. 5. The plate 70 has been located by the wheel studs 84, 86, 88 to the disc hub 90. The pin 92 is shown in the advanced position adapted to engage peripheral lug 74 preventing the plate 70, disc hub 90 and wheel (not shown) from rotating in either direction of arrow indicator 92.

It will be obvious from a commercial perspective that the present disclosure can be easily installed as an aftermarket accessory by a person of ordinary skill given the present disclosure. It will also be readily apparent to those skilled in the art that the present disclosure may also be factory installed as part of original manufacturers equipment. Furthermore, as embodiments of the present disclosure can be adapted to be activated by a remote control, it will be very useful to end users such as trade persons, the disabled and the elderly who require a means of parking and securing their trailers or vehicles that is quick and convenient to operate.

Variations

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

The invention claimed is:

1. A wheel locking or parking brake assembly for a vehicle, comprising:
   a plate member configured to be affixed to a wheel or an axle of the vehicle, the plate member having a circumferential flange with a peripheral extension or protrusion;
   an electrically powered pin assembly comprising a weatherproof housing having an electric motor disposed therein, the electric motor configured to operate a rack and pinion assembly, where a rack is configured to be driven by a pinion gear on the electric motor thereby retracting or advancing a locking pin;
   where the electric motor is affixed to a first portion of the weatherproof housing and the rack is affixed to a second portion of the weatherproof housing such that when the weatherproof housing is opened, the electric motor and the pinion gear are disengaged from the rack thereby comprising a safety override mechanism where the locking pin is configured to be manually retracted or advanced; and
   where the locking pin is configured to engage the peripheral extension or protrusion; and
   an electric power supply;
   where electric current flowing in a first direction causes the locking pin to advance in the path of the extension or protrusion to lock the wheel from rotating, and where current flowing in a second and opposite direction causes the locking pin to retract from the path of the extension or protrusion to allow the wheel to rotate; and
   where the locking pin remains in either an advanced or retracted position depending on whether the electric power supply is switched off.

2. The wheel locking or parking brake assembly of claim 1, where the plate member comprises an auxiliary disc having a plurality of wheel stud engaging apertures to accommodate various wheel stud configurations, the auxiliary disc configured to be secured to the vehicle wheel via a plurality of wheel studs and a plurality of respective wheel nuts.

3. The wheel locking or parking brake assembly of claim 1, where the peripheral extension or protrusion comprises a lug located on the circumferential flange.

4. The wheel locking or parking brake assembly of claim 1, where the electric power supply comprises a battery coupled to a polarity reversing switch which is electrically operated by a remote control.

5. The wheel locking or parking brake assembly of claim 1, where the electric power supply comprises a vehicles battery and where a polarity reversing switch is operable via the vehicles existing electric system.

6. The wheel locking or parking brake assembly of claim 1, where the weatherproof housing further comprises a lock configured to keep the weatherproof housing locked as a security measure.

7. The wheel locking or parking brake assembly of claim 1, where the electrically powered pin assembly is affixed to a mounting plate, the mounting plate being affixed in place by one or more U-bolts configured to secure the axle to one or more springs of the vehicle.

8. The wheel locking or parking brake assembly of claim 7, where the mounting plate is of a universal design that is configured to fit a differing range of vehicles.

* * * * *